Patented Aug. 16, 1949

2,479,082

UNITED STATES PATENT OFFICE 2,479,082

OLEFIN REACTIONS

John R. Roland and Jesse Harmon, Wilmington, Del., assignors to E. I. du Pont de Nemours & Company, Wilmington, Del., a corporation of Delaware No Drawing. Application April 21, 1944,
Serial No. 532,219

9 Claims. (Cl. 260—413)

This invention relates to olefine reactions, and particularly to a process for reacting olefines, such as ethylene, with carboxylic acid anhydrides. It also relates to new compositions which may be prepared by reaction between ethylene and carboxylic acid anhydrides. The type of reaction with which this invention is concerned is essentially a polymerization of the olefin in the presence of a reactant, one molecule of which supplies both end groups for the long chain or modified polymeric molecule. For convenience, such a reaction may be referred to as "telomerization" and the modified polymeric products as "telomers."

In the copending application of W. E. Hanford and J. R. Roland, S. N. 471,028, filed January 1, 1943, now U. S. Patent 2,402,137, it is disclosed that ethylene undergoes a "telomerization" reaction with numerous saturated organic oxygen-containing materials, including carboxylic acid anhydrides, in the presence of certain catalysts which are considered to be effective as sources of free radicals, namely peroxides, persulfates, oxygen, perborates, percarbonates, hydrazines, tetraethyl lead, hexachloroethane and the like. While the procedure described in the Hanford and Roland application is widely applicable in the preparation of novel reaction products of ethylene with oxygen-containing organic compounds, the process described in the above-mentioned application gives relatively low yields when applied to the reaction of ethylene with certain carboxylic acid anhydrides.

An object of the present invention is to provide an improved process for reacting ethylene with carboxylic acid anhydrides. Another object is to provide new and superior catalysts for the reaction of ethylene with carboxylic acid anhydrides. Yet another object is to provide new compositions of matter which may be prepared by the reaction of ethylene with carboxylic acid anhydrides.

These and other objects are accomplished in accordance with this invention by heating ethylene with a carboxylic acid anhydride in the presence of a catalyst, particularly a catalyst containing a positive halogen. A reaction takes place in accordance with this invention whereby the ethylene molecules combine in the form of a linear chain, to which the terminal groups are supplied by the carboxylic acid anhydride reactant. The resulting product is a carboxylic anhydride of relatively high molecular weight. In one of its simplest forms, the invention may be illustrated by the following equation, in which the anhydride reactant, for purposes of illustration, is propionic anhydride ($n$=an integer having a value of from approximately 2 to 100):

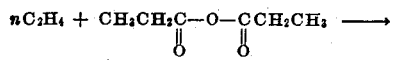

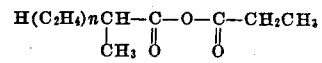

Obviously, the propionic anhydride, and the anhydride which is produced by the above reaction, each have additional reactive carbon-hydrogen bonds which could be acted on by ethylene, so that in addition to the simple products, further reaction products could be produced. According to this invention, the simple reaction products are quite readily prepared and usually only minor proportions of the more complex polymeric products are simultaneously produced. Under certain conditions, as hereinafter described, at least a minor part of the product may be obtained in the form of carboxylic acid rather than anhydride. In particular, the carboxylic acids, rather than the anhydrides may be produced if conditions are such that secondary reactions, such as hydrolysis, may occur.

The reaction of ethylene with a carboxylic anhydride is generally conducted, according to this invention, at a temperature of 100° to 400° C., preferably 150° to 350° C. Super-atmospheric pressures, e. g., 100 to 1500 atmospheres, are employed, preferably 400 to 1000 atmospheres, the upper limits of operable pressures being determined solely by the strength of available equipment.

The catalysts which are most effective in the practice of this invention are the positive halogen compounds. By "positive halogen compounds" is meant any compound which yields an alkali hypohalite when treated with an alkali hydroxide. These compounds include: inorganic hypochlorites such as calcium hypochlorite; alkali metal-N-haloaryl sulfonamides, such as potassio-N-chloroparatoluene sulfonamide, sodio N-chloroparatoluene sulfonamide, sodio N-chlorobenzene sulfonamide; N-haloamides, such as 1,3-dichloro-5,5-dimethylhydantoin, N-chlorourea, 1-chloro-5,5-dialkylhydantoins, 3-chloro-4,4-dialkylhydantoins; N-haloalkane sulfonamides and organic hypochlorites such as tertiary butyl hypochlorite. It is significant that these catalysts are not effective in the conventional Friedel-Crafts or alkylation types of reaction, which, of course, are quite unlike the present invention.

The amount of catalyst which is used in the performance of this invention is between 0.0001% and 5.0% of the total weight of reactants. The preferred range is about 0.001% to 1.0% of the weight of the reactants.

The ethylene which is employed as a reactant may contain small quantities of ethane, propane, nitrogen, hydrogen, carbon dioxide or oxygen. Oxygen in high concentrations, for example in excess of 1000 P. P. M., is generally deleterious to the reaction. Small amounts of oxygen, however, less than 1000 P. P. M., and preferably less than 50 P. P. M. do not have a marked effect on yield, and only a minor effect on the molecular weight of the products produced. While ethylene gives outstanding results in this telomerization reaction, other olefins, particularly those lower olefins or mixtures of olefins which polymerize in the presence of oxygen or peroxides, also may be used.

The reaction is best effected by reacting ethylene with carboxylic acid anhydrides having from 3 to 16 carbon atoms and at least one hydrogen attached to the carbon atom adjacent to the carboxylic anhydride group.

In carrying out this telomerization of ethylene and acid anhydrides in general, the anhydride, ethylene, and catalyst are charged into a pressure-resistant vessel, preferably after purging the reaction vessel of air with deoxygenated nitrogen or other inert gas and with the charging operation carried out under a blanket of inert gas. The vessel is closed, connected with a heating apparatus and a reservoir of ethylene. After the selected temperature has been reached the course of the reaction may be followed by the ethylene pressure drop. The desired pressure of ethylene in the agitated vessel is usually maintained by intermittent injection of ethylene.

Though it is generally not desirable, the anhydride may be diluted with an inert solvent, or with a solvent which is less reactive towards ethylene than the anhydride. If desired additional amounts of anhydride or inert solvent may also be injected after the reaction has started.

When the reaction is finished, as may be noted by the cessation of ethylene absorption, the reaction vessel is cooled, bled of excess ethylene, opened, and the reaction mixture is removed. The wax-like product may be isolated by any convenient process, such as by distillation of the volatile components of the reaction mixture at ordinary or low pressures. The product contains long chain fatty acid anhydrides, and may contain small amounts of the long chain fatty acids which may sometimes be produced during the condensation reaction, particularly if small amounts of water are present. The long chain acids may also be obtained from the reaction product by any conventional method employed for obtaining organic acids from anhydrides. Thus the crude mixtures may be subjected to the action of steam, whereby the product is recovered largely in the form of fatty acids rather than anhydrides. Alternatively, the crude mixture can be esterified, and the various esters so formed can be separated by fractional distillation. The corresponding acids may be prepared readily by saponifying the esters and acidifying the saponification products. The invention embraces the products produced by means of the telomerization reaction, particularly the higher fatty acids and their anhydrides. The invention is illustrated further by the following examples.

*Example I.*—A silver-lined high pressure reactor of 400 cc. capacity is charged with 200 grams of propionic anhydride and 0.3 gram of sodio N-chlorotoluene sulfonamide. The vessel is closed, evacuated, and placed in a shaker machine, wherein it is heated at a temperature of 198° to 203° C., while the contents are subjected to the action of ethylene at a pressure of 640 to 840 atmospheres, for a period of 14.25 hours. After removal from the reactor the reaction mixture is placed in a still, and the unreacted propionic anhydride is recovered by distillation. The combined product of four such runs weighs 236 grams, and is a telomer of ethylene and propionic anhydride. It has a saponification number of 228.4 and an acid number of 57.2.

*Example II.*—A silver-lined high-pressure reactor of 400 cc. capacity is charged with 200 grams of propionic anhydride and 0.3 gram of sodio N-chlorotoluene sulfonamide. The vessel is closed, evacuated and placed in a shaker machine, wherein it is heated at a temperature of 197° to 207° C., while the contents are subjected to the action of ethylene at a pressure of 760 to 970 atmospheres for a period of 12.5 hours. After removal from the reactor the crude reaction product is diluted with 300 grams of water and 300 grams of alcohol, and the resulting mixture is heated in a still on a steam bath until the water, ethyl propionate, and excess alcohol are removed. The residue is a soft pasty mass which is completely soluble in dilute aqueous sodium hydroxide. The alkaline solution forms a strong stable foam on agitation, and wets sulfur readily. On analysis, the pasty mixture is found to have an acid number of 161.1, corresponding to a molecular weight of 346, a saponification number of 146, a molecular weight (ebulliscopic method) of 382, and an iodine number of 1.2. A mixture of fatty acids is readily obtained from the solution in alkali by the addition of dilute mineral acid.

*Example III.*—A crude reaction product obtained in several runs by telomerization of ethylene and propionic anhydride as described in Example II is esterified by means of ethyl alcohol in the presence of p-toluene sulfonic acid catalyst, and with benzene as an agent for azeotropic removal of water. When the esterification is complete, the residue is poured into cold saturated potassium carbonate solution, separated from the water, washed until neutral and dried. Distillation of this yields 165 parts of ethyl propionate and 224 parts of higher boiling material. The latter fraction is then distilled at 1 mm. on a steam bath, yielding 80 parts of condensate. Precision distillation of the condensate gives 10 parts of material boiling at 83° to 84° C. at 38 mm., identified by analysis (68.89% carbon, 11.39% hydrogen and a saponification number of 157) and determination of physical properties (density $$\frac{25°}{4}$$

of 0.817, refractive index at 25° C. of 1.4109, and conversion of the ester by way of its chloride to an anilide melting at 91–92° C. and a p-aniside melting at 102° C.) as ethyl alpha-methylhexanoate (cf. C. A. 26, 2701; 29, 115). The distillation residue is subjected to molecular distillation at a pressure of 10 microns. Thirteen separate cuts are made, the overall boiling range being 90° to 350° C. The cuts have saponification numbers which range from 327.2 in the lowest boiling to 10.7 in the highest boiling. This indicates molecular weights of 172 to 5250. The following table shows the properties of the various fractions, which correspond to ethyl esters of acids of the formula $H(CH_2CH_2)_nCH(CH_3)COOH$, in which $n$ has average values of approximately 3 or greater. In cuts (1) and (2) $n$ is approximately 3; in cut (4) $n$ is nearly 4, and in the higher boiling cuts $n$ is greater than 4, e. g., in cut (11), $n$ has a value of approximately 21. In the fractions boiling above 300° C. $n$ has a value higher than about 21, the major part of this high-boiling product corresponding to the esters derived from anhydrides or acids in which the value of $n$ is within the range of 21 to 100.

Ethyl esters of ethylene-propionic anhydride telomers

| Cut | Distillation Tempt., °C. | Wt. Cut, grams | Per Cent of Total | Sap. No. | Mol. Wt. (from Sap. No.) |
|---|---|---|---|---|---|
| 1 | --- | 90 | 5.2 | 4.2 | 327.2 | 172 |
| 2 | --- | 100 | 17.3 | 13.8 | 333.2 | 168 |
| 3 | 110 | 120 | 8.0 | 6.4 | 281.8 | 200 |
| 4 | 120 | 150 | 13.1 | 10.5 | 267.0 | 210 |
| 5 | 150 | 170 | 9.6 | 7.7 | 217.7 | 258 |
| 6 | 170 | 195 | 12.8 | 10.2 | 185.9 | 302 |
| 7 | 195 | 205 | 5.8 | 4.6 | 165.6 | 339 |
| 8 | 205 | 220 | 2.7 | 2.2 | 163.1 | 344 |
| 9 | 220 | 250 | 16.3 | 13.0 | 140.6 | 399 |
| 10 | 250 | 270 | 11.5 | 9.2 | 117.9 | 476 |
| 11 | 270 | 300 | 8.8 | 7.0 | 79.7 | 704 |
| 12 | 300 | 330 | 6.1 | 4.8 | 27.8 | 2,020 |
| 13 | 330 | 350 | 3.0 | 2.4 | 10.7 | 5,250 |

The isolation of these esters, together with the identification of ethyl alpha-methylhexanoate (an ester of $H(CH_2CH_2)_2CH(CH_3)COOH$), provides evidence as to the nature of the anhydrides and acids produced by the telomerization reaction, showing that the telomers are the result of introducing a chain comprising a plurality of directly combined ethylene units attached between an alpha carbon and a hydrogen of the carboxylic anhydride. Thus the anhydrides produced in Example II are for the most part compounds of the formula $H(CH_2CH_2)_nC(CH_3)COOCOCH_2CH_3$ wherein $n$ has a value of 3 to approximately 100.

The saponification products of these esters can be acidified to yield the corresponding fatty acids. Thus the acids derived from the saponification products of cuts 1 and 2 include $$H(CH_2CH_2)_3CH(CH_3)COOH$$

and the acid $H(CH_2CH_2)_4CH(CH_3)COOH$ is correspondingly obtained from cut 4. The acids derived from cuts 10 to 13 inclusive may be represented by the formula $$H(CH_2CH_2)_nCH(CH_3)COOH$$

in which $n$ is an integer having an average value of 13 or higher.

*Example IV.*—Example II is repeated, except for the choice of reaction pressure. The effects of reaction pressure on the product are illustrated in the following table. The average number of carbon atoms present in the acids obtained by hydrolysis of the telomers is determined by titration.

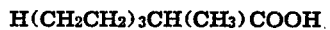

| Pressure Atmospheres | Yields of Acids, grams | Average Number of Carbon Atoms in the Acids (by titration) |
|---|---|---|
| (1) 780 to 980 | 29 | 33 |
| (2) 600 to 700 | 27 | 25 |
| (3) 360 to 500 | 23 | 17 |

The above analyses clearly show that the average length of the polyethylene chain in the ethylene-propionic anhydride telomers tends to increase with increased telomerization pressures.

*Example V.*—A mixture containing 200 parts of isobutyric anhydride and 0.3 part of sodio N-chloro-p-toluene sulfonamide is processed with ethylene at 193° to 201° C. under 790 to 970 atmospheres pressure for 16.7 hours. There is obtained 238 parts of a reaction mixture from which the excess isobutyric anhydride is evaporated to give an isobutyric anhydride-ethylene telomer. Analysis of the telomer by alcoholysis and hydrolysis shows it to be a mixed anhydride of isobutyric acid and an acid having an average molecular weight of 341. There is obtained by hydrolysis 85 parts of an acid having an acid number of 197.7 corresponding to an average molecular weight of 284, and an iodine number of 4.9. Thus the telomer is a long chain fatty acid anhydride, having an average of nearly 10 ethylene units in the $—(CH_2CH_2)_nH$ chains which are attached to the alpha carbon atoms.

*Example VI.*—Example II is repeated except for the substitution of various anhydrides, as shown in the table below, for propionic anhydride. In each case, 200 parts by weight of the anhydride are employed. The products are waxy compositions which upon hydrolysis give long chain alkali-soluble acids. When acetic anhydride is used, the reaction mixture yields a hard, waxy composition.

| | Anhydride Used | Yield in Parts by Weight | Molecular Weight of Acid Derived from Telomer |
|---|---|---|---|
| (1) | Acetic | 4 | --- |
| (2) | Succinic | 4 | 1,200 |
| (3) | n-butyric | 20 | 548 |
| (4) | Caprylic | 57 | 243 |

*Example VII.*—A mixture containing 100 grams of isobutyric anhydride and 0.3 gram of calcium hypochlorite is processed with ethylene under conditions similar to those used in Example II. The reaction mixture yields 110 grams of an acid having an acid number of 160.7, which corresponds to an average molecular weight of 349.

*Example VIII.*—Example II is repeated except for the noted changes in the amount of anhydride charged into the 400 c. c. reactor:

| Propionic Anhydride, grams | Initial Weight Ratio of Propionic Anhydride:Ethylene | Yield of Mixed Acid, grams | Molecular Weight (from Acid. No.) |
|---|---|---|---|
| 50 | 1:3 | 53 | 1,600 |
| 100 | 1:1.3 | 51 | 403 |
| 300 | 1:0.14 | 12 | 335 |

These experiments show that the molecular weight of the telomer is higher when the ratio of carboxylic anhydride to ethylene in the charge is decreased.

The data contained in the above examples illustrate the novel reaction of this invention, whereby ethylene and carboxylic acid anhydrides yield long chain fatty acid anhydrides, particularly when reacted in the presence of a compound containing a positive halogen atom. The reaction is not limited to the anhydrides used in the examples, but is applicable generally to alkanoic anhydrides which have at least one hydrogen on a carbon alpha to a carboxylic anhydride group. These include such mixed anhydrides as acetic-propionic, acetic-isobutyric, benzoic-propionic, pivalic-propionic, pivalic- isobutyric, and the like, as well as cyclic alkandioic anhydrides, such as alpha-methylsuccinic, alpha-methoxysuccinic, glutaric, alpha-methylglutaric; alpha-, alpha-dimethylglutaric; beta, beta-dimethlglutaric. In the examples, the weight ratio of carboxylic acid anhydride to ethylene varies from 1:3 to 1:0.14. Actually the operable range is much wider, including 1:10 to 1:0.03. In a continuous apparatus the wider range of relative concentrations is more readily employed than in batchwise operation.

As stated above, diluents are generally not necessary in the telomerization of ethylene with acid anhydrides according to the invention. Relatively inert diluents which may be used include tertiary butyl methyl ether, methyl pivalate, toluene, benzene and chlorobenzene. Highly branched sterically hindered compounds, like isooctane, pentamethylethane, pivaloin, pivalone, and the like may be used as reaction media even though some contain secondary or tertiary hydrogens.

The products may be separated into their individual components in the manner described in Example III or by fractional crystallization or precipitation from solution.

The products of this invention find wide application for practical uses. The primary products, which are anhydrides, can be used to make fabrics water repellent. These anhydrides can also be converted to esters which are valuable as waxes, softeners, plasticizers, and special lubricants. The acids or anhydrides are readily converted to synthetic soaps by reaction with alkali.

Organic solutions of these soaps may be used as dry cleaning agents. Alkaline earth and heavy metal soaps may be used as bodying agents for waxes and greases. Certain heavy metal and substituted ammonium soaps show value as protective coatings against corrosion. These synthetic long-chain acids find use as milling aids in the processing of natural and synthetic rubbers and as an anti-tack agent for calendering plastics. The primary anhydride products may be readily converted directly or indirectly to amides. These derivatives find use in wax and polish compositions. The amides may be further reacted with an aldehyde, for example formaldehyde, to yield N-methylolamides which find use in the water repellent finishing of paper and fabric. The methylolamides may be further reacted with a salt of a tertiary amine or an ammonium salt to yield high grade permanent water repellent finishes. The anhydride mixtures obtained by this process may be converted by known reactions to long-chain alcohols, sulfates, chlorides, mercaptans and nitriles. The uses to which such secondary products may be put are generally well known to the art.

We claim:

1. A process for preparing long chain fatty acid anhydrides which comprises reacting ethylene with a carboxylic acid anhydride having at least one hydrogen atom on a carbon alpha to the carboxylic anhydride group under superatmospheric pressure at a temperature in the range 100° to 400° C. in the presence of a positive halogen compound which yields alkali hypohalite when treated with an alkali hydroxide.

2. A process for preparing long chain fatty acid anhydrides which comprises reacting ethylene with a carboxylic acid anhydride having at least one hydrogen atom on a carbon alpha to the carboxylic anhydride group under a pressure of 400 to 1000 atmospheres, at a temperature in the range of 100° to 400° C. in the presence of a positive halogen compound which yields alkali hypohalite when treated with an alkali hydroxide.

3. The process set forth in claim 2 in which the said positive halogen compound is an alkali metal N-haloaryl sulfonamide.

4. The process set forth in claim 2 in which the said carboxylic acid anhydride is propionic anhydride and the said positive halogen compound is sodio N-chlorotoluenesulfonamide.

5. The process set forth in claim 2 wherein the said carboxylic acid anhydride contains from 3 to 16 carbon atoms per molecule, and at least one hydrogen atom attached to a carbon atom adjacent to the carboxylic anhydride group.

6. In a process for preparing long chain fatty acid anhydrides, the steps which comprise reacting ethylene with a carboxylic acid anhydride containing 3 to 16 carbon atoms per molecule and at least one hydrogen atom attached to a carbon atom adjacent to the carboxylic acid anhydride at a temperature in the range of 150° to 400° C. and at a pressure in the range of 400 to 1000 atmospheres in the presence of a positive halogen compound which yields alkali hypohalite when treated with an alkali hydroxide, and thereafter separating from the resulting reaction product a mixture of long chain fatty acid anhydrides.

7. The process set forth in claim 6, wherein the said carboxylic acid anhydride is isobutyric anhydride.

8. In a process for preparing long chain fatty acid anhydrides, the steps which comprise heating one part by weight of carboxylic acid anhydride with 0.03 to 10 parts by weight of ethylene and from 0.0001% to 5.0% of a positive halogen compound based on the weight of ethylene plus anhydride, at a temperature in the range of 100° to 400° C. under superatmospheric pressure, and separating from the resultant reaction mixture the product containing compounds of the class of long chain fatty acid anhydrides.

9. In a process for preparing long chain fatty acid anhydrides the steps which comprise heating one part by weight of propionic anhydride with 0.14 to 3 parts by weight of ethylene and from 0.001% to 1.0% of an alkali metal N-haloaryl sulfonamide based on the weight of ethylene plus anhydride, at a temperature in the range of 140° to 400° C. under 400 to 1000 atmospheres pressure, and separating from the resultant reaction mixture the product containing compounds of the class of long chain fatty acid anhydrides.

JOHN R. ROLAND.
JESSE HARMON.

REFERENCES CITED

The following references are of record in the file of this patent:

UNITED STATES PATENTS

| Number | Name | Date |
|---|---|---|
| 2,032,159 | Whitmore | Feb. 25, 1936 |
| 2,293,649 | Howk | Aug. 18, 1942 |
| 2,433,015 | Roland et al. | Dec. 23, 1947 |
| 2,433,016 | Coffman | Dec. 23, 1947 |

OTHER REFERENCES

Beilstein, 4th edition, vol. II, pages 323 and 324.
Beilstein, vol. II, Vierte Auflage Literature of 1920–29.